United States Patent Office 3,246,030
Patented Apr. 12, 1966

3,246,030
PROCESS FOR PRODUCING A FLUORINATED ALCOHOL AND COMPOUND FORMED THEREIN
Christian A. Seil, Santa Monica, Robert H. Boschan, Los Angeles, and James P. Holder, Woodland Hills, Calif., assignors to Douglas Aircraft Company, Inc., Santa Monica, Calif., a corporation of Delaware
No Drawing. Filed Aug. 3, 1964, Ser. No. 387,167
15 Claims. (Cl. 260—466)

This invention relates to a certain polyfluorinated alcohol and is particularly concerned with a novel procedure for producing 3,3,4,4,5,5,5-heptafluoro-1-pentanol in high yield, and to a novel intermediate formed in such process. The 3,3,4,4,5,5,5-heptafluoro-1-pentanol produced in the invention process is of particular value in the production of certain highly useful esters described below.

In our copending applications Serial Nos. 387,187; 387,188; 387,168; and 387,189, all filed on even date herewith, there are disclosed respectively, the benzenephosphonate, disiloxane, orthosilicate and 3-methyl glutarate esters of 3,3,4,4,5,5,5-heptafluoro-1-pentanol, as novel compounds having particular utility as hydraulic fluids, heat transfer fluids, and as lubricants, which possess the advantageous properties of high fire resistance, high temperature stability and which remain in liquid form over a wide temperature range. Such hydraulic fluids, heat transfer fluids, and lubricants have utility in aircraft systems, particularly high speed modern aircraft.

It is known in the prior art to prepare 3,3,4,4,5,5,5-heptafluoro-1-pentanol by first carrying out the Grignard reaction with 3,3,4,4,5,5,5-heptafluoropentyl iodide, then reacting such Grignard reagent with oxygen, and then hydrolizing this oxygenated material. However, this process is cumbersome and further, such procedure involves three reaction steps and is hazardous when carried out using large amounts of reactants in a commercial type operation.

It is an object of this invention to provide procedure for preparing 3,3,4,4,5,5,5-heptafluoro-1-pentanol easily and in high yields using readily available raw materials and reactants.

Another object is the provision of a process for preparing 3,3,4,4,5,5,5-heptafluoro-1-pentanol in a two step process employing a heptafluoropentyl halide, preferably 3,3,4,4,5,5,5-heptafluoropentyl iodide, as starting material, in high overall yields of the order of about 75%, based on such starting material.

Another object of the invention is to provide the novel intermediate nitrate ester 3,3,4,4,5,5,5-heptafluoropentyl nitrate, which can be reduced in a single step to produce the corresponding alcohol product 3,3,4,4,5,5,5-heptafluoro-1-pentanol.

Yet another object is to provide procedure for producing 3,3,4,4,5,5,5-heptafluoro-1-pentanol by a process commencing with a perfluoropropyl halide such as perfluoropropyl iodide and in which the reaction in each of the steps can be carried out in extremely high yield to product the above final polyfluorinated pentanol product in high overall yield.

Other objects and advantages of the invention will appear hereinafter.

It has now been found that 3,3,4,4,5,5,5-heptafluoro-1-pentanol can be readily produced through the intermediate nitrate ester 3,3,4,4,5,5,5-heptafluoropentyl nitrate, in a two step process in which 3,3,4,4,5,5,5-heptafluoropentyl iodide or a corresponding halide such as the bromide is reacted with a nitrating agent such as silver nitrate in the first step to form such nitrate ester, and the latter material is reacted with a reducing agent such as ammonium hydrosulfide to form the above polyfluorinated pentanol product. Each of the reactions proceeds readily at high yields, for example, such first and second stage reactions each can be carried out in yields ranging from about 80% up to about 90% and above. The polyfluorinated alcohol product thus produced by the above-noted two stage reaction commencing with the heptafluoropentyl halide, e.g., iodide, starting material can be obtained in overall yields of the order of about 70% to about 80% based on the halide starting material.

Thus, it is seen that by carrying out the reaction for producing 3,3,4,4,5,5,5-heptafluoro-1-pentanol in accordance with the invention process, through the intermediate nitrate ester, high yields of the product are obtained. Further, the invention process involves only a two step or two stage reaction as compared to the three step reaction of the above prior art process involving the production of the Grignard reagent, and the invention process proceeds smoothly and is suitable for larger scale operations employing substantial proportions of reactants, whereas the above-noted prior art process can be carried out satisfactorily on only a small scale, employing only relatively small proportions of reactants.

The first stage reaction for producing the intermediate nitrate ester 3,3,4,4,5,5,5-heptafluoropentyl nitrate can be carried out by reacting a 3,3,4,4,5,5,5-heptafluoropentyl halide with a suitable nitrating agent. Such halide can be, for example, the chloride, bromide or iodide, preferably the iodide. The nitrating agent employed can be, for example, silver nitrate or mercurous nitrate, and is preferably silver nitrate. Thus, the novel ester intermediate can be produced by reacting approximately equimolar proportions of 3,3,4,4,5,5,5-heptafluoropentyl iodide and silver nitrate. In carrying out such reaction, a mixture of 3,3,4,4,5,5,5-heptafluoropentyl iodide and silver nitrate in a suitable solvent such as acetonitrile is heated, preferably at reflux temperature, for an extended period, e.g., of about 6 to 12 hours. Silver iodide precipitates in the reaction and the reaction mixture is filtered to obtain a filtrate containing the nitrate ester product. The acetonitrile solvent is removed by distillation, preferably at reduced pressure, and the residue product is distilled at still lower pressure to recover the nitrate ester intermediate 3,3,4,4,5,5,5-heptafluoropentyl nitrate.

The second stage of the reaction for producing 3,3,4,4,5,5,5-heptafluoro-1-pentanol from the above-noted nitrate ester intermediate, is carried out by reacting such nitrate ester with a suitable reducing agent. Reducing agents which can be employed for this purpose include, for example, ammonium hydrosulfide and lithium aluminum hydride. Ammonium hydrosulfide has been found to be the preferred reducing agent, the use of lithium aluminum hydride as reducing agent requiring particular precautions, especially with respect to the necessity for using limited amounts of reactants to properly control the rate of the reaction due to the induction period. The use of the latter reducing agent has been found satisfactory where smaller amounts of the intermediate nitrate ester are reacted with such reducing agent.

Thus, for example, reaction of 3,3,4,4,5,5,5-heptafluoropentyl nitrate and ammonium hydrosulfide to produce the corresponding heptafluoropentanol product can be carried out by mixing the nitrate ester with a suitable solvent such as methanol, ethanol or isopropanol, and then adding the ammonium hydrosulfide reducing agent to such mixture over a period of time, e.g., about 2 to 4 hours, preferably in a proportion of about 8 moles of the hydrosulfide to about 1 mole of the nitrate, while maintaining the reaction mixture at approximately normal or at somewhat elevated temperatures, e.g., from about 20° to about 50° C. Sulfur precipitates in the reaction and the sulfur precipitate is filtered out, the filtrate containing the polyfluorinated alcohol product. Solvent is distilled off from the reaction product mixture and the polyfluorinated alcohol product residue is then distilled to produce a distillate of 3,3,4,4,5,5,5-heptafluoro-1-pentanol.

The 3,3,4,4,5,5,5-heptaflouoropentyl halide, preferably the iodide reactant, employed in the first stage reaction to produce the intermediate nitrate ester, can be obtained in any known manner. However, it has been found particularly desirable and efficient, in conjunction with the two stage process of the invention described above, to prepare such halide, preferably the iodide, by reacting a perfluoropropyl halide, preferably perfluoropropyl iodide, with ethylene, preferably employing approximately equimolar proportions of the reactants. Such reaction can be carried out in yields of the order of 90% or more. This reaction can be readily carried out, for example, by placing perfluoropropyl iodide, in suitable proportion, in a bomb and introducing ethylene into the bomb until a suitable pressure has been obtained, e.g., of the order of about 100 to 200 p.s.i. The bomb is then heated at elevated temperatures, e.g., of the order of 150° to about 250° C. for a suitable period, preferably alternately cooling the bomb and repressurizing with ethylene during such period, until the reaction is completed.

By preparing the halide, preferably 3,3,4,4,5,5,5-heptafluoropentyl iodide, in the above manner and then carrying out the above described process using such halide, to produce the final polyfluorinated alcohol product, a three stage process is provided in which the final product 3,3,-4,4,5,5,5-heptafluoro-1-pentanol can be produced in overall yield of between about 65% and about 70% based on the perfluoropropyl halide, e.g., iodide, starting material.

The following are examples of practice of the invention for producing the above described polyfluorinated alcohol product through the intermediate nitrate ester, and examples of utilization of such alcohol for producing certain valuable esters.

EXAMPLE 1

To 1500 ml. of acetonitrile are added 247 g. (1.46 moles) of silver nitrate. When the silver nitrate has all dissolved, 392.7 g. (1.21 moles) or 3,3,4,4,5,5,5-heptafluoropentyl iodide are added rapidly and the mixture is heated to reflux temperature and refluxed overnight.

The mixture is then cooled and filtered, and the silver iodide precipitate is washed with acetonitrile and ether. The filtrate is poured into 4 liters of ice water, and the bottom nitrate ester layer is withdrawn. The aqueous layer is extracted with ether, and the ether extracts are added to the organic layer, which is then dried over anhydrous magnesium sulfate. Most of the ether is removed by distillation at atmospheric pressure, then most of the acetonitrile is removed by distillation at reduced pressure between 100 mm. and 50 mm. pressure. The residue is distilled at lower pressure; the main nitrate ester fraction, 266.2 g. (84.9% yield), distills at 50° C. (30 mm. pressure).

To 284.1 g. (1.10 moles) of 3,3,4,4,5,5,5-heptafluoropentyl nitrate in 930 ml. of methanol are added 2340 ml. of a 3.75 molar ammonium hydrosulfide solution, corresponding to 8.8 moles of ammonium hydrosulfide. The latter solution is prepared by diluting one part of a hydrogen sulfide-saturated concentrated ammonium hydroxide solution with 3 parts of water by volume. The temperature is maintained at 24–45.5° C. during the addition, which is complete in 2¾ hours. The bottom organic layer is withdrawn and the sulfur precipitate is filtered off. The precipitate is washed with one 1100 ml. portion and two 730 ml. portions of ether, and these portions are used to extract the aqueous layer; the ether extracts are then added to the organic layer, which is washed three times with water and dried over a mixture of anhydrous magnesium sulfate and anhydrous potassium carbonate. The ether is removed by distillation at atmospheric pressure; the main fluoroalcohol fraction consisting of product 3,3,4,4,5,5,5-heptafluoro-1-pentanol, 206.7 g. (88.0% yield) distills at 119°–124° C.

An overall yield of 3,3,4,4,5,5,5-heptafluoro-1-pentanol of about 75% is obtained in the above two stage reaction, based on the heptafluoropentyl iodide starting material.

EXAMPLE 2

The procedure of Example 1 is repeated except employing 3,3,4,4,5,5,5-heptafluoropentyl bromide as starting material. Results similar to Example 1 are obtained.

EXAMPLE 3

300 g. (1.01 moles) of re-distilled perflouoropropyl iodide are placed in a stainless steel cylinder, which is then cooled in Dry Ice and evacuated to a pressure of 30 mm. of mercury. After warming to room temperature, ethylene is added to the cylinder until the pressure reaches 150 p.s.i.; the cylinder is then heated in a bath maintained at 200°–245° C. and held at this temperature for successive periods of 4 hours, 4 hours, 14 hours, 3½ hours and 2½ days; the cylinder is cooled to room temperature and re-pressurized with ethylene to 150 p.s.i. between such successive heating periods. The main product fraction of 3,3,4,4,5,5,5-heptafluoropentyl iodide, 301.7 g. (91.7% yield) distills at 118°–119° C.

*Analysis.*—Calculated for $C_5H_4F_7I$: C, 18.54; H, 1.24; I, 39.17. Found: C, 18.58; H, 1.28; I, 37.98.

The 3,3,4,4,5,5,5-heptafluoropentyl iodide thus produced is then employed in the process of Example 1 above, forming first the nitrate ester intermediate, and reducing the latter to produce the final product, 3,3,4,4,5,5,5-heptafluoro-1-pentanol. The overall yield of the polyfluorinated alcohol product based on the perfluoropropyl iodide starting material is 68.5%.

Example 4

To 14.6 g. (0.383 mole) of lithium aluminum hydride in 300 ml. of anhydrous ether under dry nitrogen atmosphere is added 30.0 g. (0.116 mole) of 3,3,4,4,5,5,5-heptafluoropentyl nitrate in 75 ml. of anhydrous ether. The addition is complete in 45 minutes, and the temperature varies from about 25° C. to 35° C. (reflux). Mixing is continued for 45 minutes more with no external heating, at which point the mixture begins to boil more vigorously; after an additional 15 minutes about 100 ml. of ether are added, and mixing is continued for 25 minutes longer. External heat is then applied and the mixture is refluxed for 3 hours, then 75 ml. of ether are added and heating is discontinued.

After standing overnight the mixture is treated dropwise with 80 g. water to decompose the excess hydride, then acidified with concentrated hydrochloric acid. The aqueous layer is removed and extracted with three 100 ml. portions of ether, which are then added to the organic layer. The organic layer is dried over anhydrous magnesium sulfate, and the ether is removed by distillation.

The residue is distilled at atmospheric pressure, the main fraction consisting essentially of 3,3,4,4,5,5,5-heptafluoro-1-pentanol product, 17.3 g. (69.8% yield) distills at 111°–114° C.

EXAMPLE 5

*Bis(3,3,4,4,5,5,5-heptafluoropentyl) benzenephosphonate*

To a mixture of 90.0 g. (0.421 mole) of 3,3,4,4,5,5,5-heptafluoro-1-pentanol, 36.5 g. (0.461 mole) of pyridine and 100 ml. benzene, is added dropwise with stirring 41 g. (0.21 mole) of re-distilled benzene phosphonyl dichloride. The temperature is maintained at 15°–18° C. during the addition, which is complete in one hour and 25 minutes. The mixture is warmed to approximately 25° C. and stirred at this temperature for 1 hour, then heated to reflux temperature and refluxed overnight. The mixture is then cooled and poured into 600 ml. of water. The bottom organic layer is withdrawn and the aqueous layer is extracted with two 100 ml. portions of ether. The ether extracts are then added to the organic layer, which is then washed with two 100 ml. portions of 5% hydrochloric acid, 100 ml. of 5% sodium bicarbonate, and 100 ml. of water. After drying over anyhdrous magnesium sulfate, the solvents are removed by lowering the pressure with a water aspirator while heating.

The residue is distilled at lower pressure; the main product fraction 100.5 g. (87.0% yield) distills at 102.5°–103° C. (0.10–0.12 mm. mercury pressure).

*Analysis.*—Calculated for $C_{16}H_{13}F_{14}O_3P$: C, 34.92; H, 2.38; P, 5.63. Found: C, 35.08; H, 2.86; P, 5.55.

The bis (3,3,4,4,5,5,5-heptafluoropentyl) benzenephosphonate ester thus produced has a viscosity at 210° F. of 2.27 centistokes, a pour point of the order of −60° F., a density of 1.53 g./ml. at 77° F., and a thermal stability in the range of about 400° F. to about 500° F. Such phosphonate ester has a high autoignition temperature, good hydrolytic stability and high fire resistance. Such compound can be employed as a hydraulic fluid in the hydraulic systems of aircraft.

EXAMPLE 6

*Hexakis-(3,3,4,4,5,5,5-heptafluoropentyloxy) disiloxane*

In a flask are placed 28.6 g. (0.0834 mole) of redistilled hexaethoxy disiloxane, 125 g. (0.584 mole) of 3,3,4,4,5,5,5-heptafluoro-1-pentanol, and 0.5 g. of sodium. The mixture is heated to reflux; ethanol is distilled off.

The unreacted fluorinated pentanol is removed by distillation at between 15 mm. and 5 mm. mercury. The disiloxane residue is distilled at 0.45 mm. The main disilonaxe fraction, 61.3 g. (54.4% yield), distills at 113°–116° C. (0.45 mm. mercury).

*Analysis.*—Calculated for $C_{30}H_{24}F_{42}O_7Si_2$: C, 26.68; H, 1.79; F, 59.08. Found: C, 27.27; H, 1.97; F, 59.12.

The hexakis-(3,3,4,4,5,5,5-heptafluoropentyloxy) disiloxane thus produced, has a viscosity at 210° F. of 1.29 centistokes and a viscosity at −65° F. of 667 centistokes. The compound has a pour point below −150° F., and a density of 1.59 g./ml. at 77° F., and a thermal stability in the range of about 500° F. to about 600° F. Such disiloxane has a high autoignition temperature, good hydrolytic stability and high fire resistance. Such compound can be employed as a hydraulic fluid or as a heat transfer medium, e.g., as a coolant, in the hydraulic systems of aircraft, for operation at very low temperatures and also at high temperatures.

Example 7

*Tetrakis-(3,3,4,4,5,5,5-heptafluoropentyl) orthosilicate*

In a flask is placed 20.8 g. (0.1 mole) of redistilled tetraethyl orthosilicate, 107 g. (0.5 mole) of 3,3,4,4,5,5,5-heptafluoro-1-pentanol and 0.5 g. of sodium.

The mixture is heated to reflux; and ethanol is distilled off through a vacuum-jacketed Vigreux column.

The unreacted alcohol is removed by distillation at between 15 mm. and 5 mm. mercury pressure. The orthosilicate residue is distilled at 0.2 mm.; the main fraction of orthosilicate, 69.0 g. (78.3%) distills at 98°–113° C. (0.2 mm. mercury).

The tetrakis - (3,3,4,4,5,5,5 - heptafluoropentyl) orthosilicate thus produced, has a viscosity at 210° F. of 1.28 centistokes and a viscosity at −65° F. of 687 centistokes. The compound has a pour point below −150° F., a density of 1.60 g./ml. at 77° F., and a thermal stability in the range of about 500° F. to about 600° F. Such orthosilicate has a high autoignition temperature, good hydrolytic stability and high fire resistance. Such compound can be employed as a hydraulic fluid or as a heat transfer medium, e.g., as a coolant, in the hydraulic systems of aircraft, for operation at very low temperatures and also at high temperatures.

From the foregoing, it is seen that the invention provides novel procedure for the preparation of the polyfluorinated alcohol 3,3,4,4,5,5,5-heptafluoro - 1 - pentanol, through the novel nitrate ester 3,3,4,4,5,5,5-heptafluoropentyl nitrate, said alcohol being especially useful in producing certain esters having valuable characteristics as fire resistant hydraulic fluids, lubricants and heat transfer media.

While we have described particular embodiments of our invention for the purpose of illustration, it should be understood various modifications and adaptations thereof may be made within the spirit of the invention, as set forth in the appended claims.

We claim:

1. The process which comprises reacting a heptafluoropentyl halide selected from the group consisting of the chloride, bromide and iodide, with a nitrating agent selected from the group consisting of silver nitrate and mercurous nitrate, to form 3,3,4,4,5,5,5-heptafluoropentyl nitrate, and then reacting said last mentioned nitrate with a reducing agent to form 3,3,4,4,5,5,5-heptafluoro-1-pentanol.

2. The process which comprises reacting a heptafluoropentyl halide selected from the group consisting of the chloride, bromide and iodide with silver nitrate to form 3,3,4,4,5,5,5-heptafluoropentyl nitrate, and then reacting said last mentioned nitrate with a reducing agent to form 3,3,4,4,5,5,5-heptafluoro-1-pentanol, said reducing agent being selected from the group consisting of ammonium hydrosulfide and lithium aluminum hydride.

3. The process which comprises reacting 3,3,4,4,5,5,5-heptafluoropentyl iodide with a nitrating agent selected from the group consisting of silver nitrate and mercurous nitrate, to form 3,3,4,4,5,5,5-heptafluoropentyl nitrate, and then reacting 3,3,4,4,5,5,5-heptafluoropentyl nitrate with a reducing agent to form 3,3,4,4,5,5,5-heptafluoro-1-pentanol, said reducing agent being selected from the group consisting of ammonium hydrosulfide and lithium aluminum hydride.

4. The process which comprises reacting 3,3,4,4,5,5,5-heptafluoropentyl iodide with silver nitrate to form 3,3,4,4,5,5,5-heptafluoropentyl nitrate, and then reacting 3,3,4,4,5,5,5-heptafluoropentyl nitrate with a reducing agent to form 3,3,4,4,5,5,5-heptafluoro-1-pentanol, said reducing agent being selected from the group consisting of ammonium hydrosulfide and lithium aluminum hydride.

5. The process which comprises reacting 3,3,4,4,5,5,5-heptafluoropentyl iodide with silver nitrate to form 3,3,4,4,5,5,5-heptafluoropentyl nitrate, and then reacting 3,3,4,4,5,5,5-heptafluoropentyl nitrate with ammonium hydrosulfide to form 3,3,4,4,5,5,5-heptafluoro-1-pentanol.

6. The process which comprises reacting 3,3,4,4,5,5,5-heptafluoropentyl iodide with silver nitrate to form 3,3,4,4,5,5,5-heptafluoropentyl nitrate, and then reacting 3,3,4,4,5,5,5-heptafluoropentyl nitrate with lithium aluminum hydride to form 3,3,4,4,5,5,5-heptafluoro-1-pentanol.

7. The process which comprises reacting 3,3,4,4,5,5,5-heptafluoropentyl iodide and silver nitrate in substantially equimolar proportions to form 3,3,4,4,5,5,5-heptafluoropentyl nitrate, and then reacting 3,3,4,4,5,5,5-heptafluoropentyl nitrate and ammonium hydrosulfide employing a proportion of about 8 moles of said hydrosulfide to about 1 mole of said nitrate, to form 3,3,4,4,5,5,5-heptafluoro-1-pentanol.

8. The process which comprises heating 3,3,4,4,5,5,5-heptafluoropentyl iodide and a silver nitrate solution for a period sufficient to form 3,3,4,4,5,5,5-heptafluoropentyl nitrate, and then reacting a mixture of 3,3,4,4,5,5,5-heptafluoropentyl nitrate and ammonium hydrosulfide for a period sufficient to form 3,3,4,4,5,5,5-heptafluoro-1-pentanol in high yield based on said heptafluoropentyl iodide.

9. The process which comprises heating a mixture of 3,3,4,4,5,5,5-heptafluoropentyl iodide and silver nitrate in approximately equimolar proportions for a period sufficient to form 3,3,4,4,5,5,5-heptafluoropentyl nitrate, and then reacting a mixture of 3,3,4,4,5,5,5-heptafluoropentyl nitrate and ammonium hydrosulfide for a period sufficient to form 3,3,4,4,5,5,5-heptafluoro-1-pentanol in high yield of the order of about 70% to about 80% based on said heptafluoropentyl iodide.

10. The process which comprises reacting a perfluoropropyl halide selected from the group consisting of the chloride bromide and iodide, and ethylene to form the corresponding 3,3,4,4,5,5,5-heptafluoropentyl halide, reacting said 3,3,4,4,5,5,5-heptafluoropentyl halide with silver nitrate to form 3,3,4,4,5,5,5-heptafluoropentyl nitrate, and then reacting 3,3,4,4,5,5,5-heptafluoropentyl nitrate with a reducing agent to form 3,3,4,4,5,5,5-heptafluoro-1-pentanol, said reducing agent being selected from the group consisting of ammonium hydrosulfide and lithium aluminum hydride.

11. The process which comprises reacting perfluoropropyl iodide and ethylene to form 3,3,4,4,5,5,5-heptafluoropentyl iodide, reacting 3,3,4,4,5,5,5 - heptafluoropentyl iodide with silver nitrate to form 3,3,4,4,5,5,5-heptafluoropentyl nitrate, and then reacting said last mentioned nitrate with ammonium hydrosulfide to form 3,3,4,4,5,5,5-heptafluoro-1-pentanol.

12. The process which comprises heating under pressure perfluoropropyl iodide and ethylene at temperatures of about 150° to about 250° C. to form 3,3,4,4,5,5,5-heptafluoropentyl iodide, heating 3,3,4,4,5,5,5-heptafluoropentyl iodide and a silver nitrate solution for a period sufficient to form 3,3,4,4,5,5,5-heptafluoropentyl nitrate, and then reacting a mixture of 3,3,4,4,5,5,5-heptafluoropentyl nitrate and ammonium hydrosulfide for a period sufficient to form 3,3,4,4,5,5,5-heptafluoro-1-pentanol.

13. The process which comprises reacting perfluoropropyl iodide and ethylene in substantially equimolar proportions at temperatures from about 150° to about 250° C. to form 3,3,4,4,5,5,5-heptafluoropentyl iodide, reacting 3,3,4,4,5,5,5-heptafluoropentyl iodide and silver nitrate in substantially equimolar proportions to form 3,3,4,4,5,5,5-heptafluoropentyl nitrate, and then reacting 3,3,4,4,5,5,5-heptafluoropentyl nitrate and ammonium hydrosulfide employing a proportion of about 8 moles of said hydrosulfide to about 1 mole of said nitrate, to form 3,3,4,4,5,5,5-heptafluoro-1-pentanol in high yield based on said perfluoropropyl iodide.

14. The compound 3,3,4,4,5,5,5-heptafluoropentyl nitrate.

15. The process which comprises reacting a hepafluoropentyl halide selected from the group consisting of the chloride, bromide and iodide, with a nitrating agent selected from the group consisting of silver nitrate and mercurous nitrate, to form 3,3,4,4,5,5,5-heptafluoropentyl nitrate, and then reacting said last mentioned nitrate with a reducing agent to form 3,3,4,4,5,5,5-heptafluoro-1-pentanol, said reducing agent being selected from the group consisting of ammonium hydrosulfide and lithium aluminum hydride.

References Cited by the Examiner
UNITED STATES PATENTS
3,040,085   6/1962   Andreades _____ 260—466

OTHER REFERENCES
Haight et al., Chem. Abs., vol. 57, page 4080 (1962), QD 1A51.
Hammond et al., Chem Abs., vol. 59, pages 11236 to 11237 (1963), QD 1A51.

LEON D. ROSDOL, *Primary Examiner.*

REUBEN EPSTEIN, CARL D. QUARFORTH, BENJAMIN R. PADGETT, *Examiners.*

L. A. SEBASTIAN, *Assistant Examiner.*